United States Patent Office

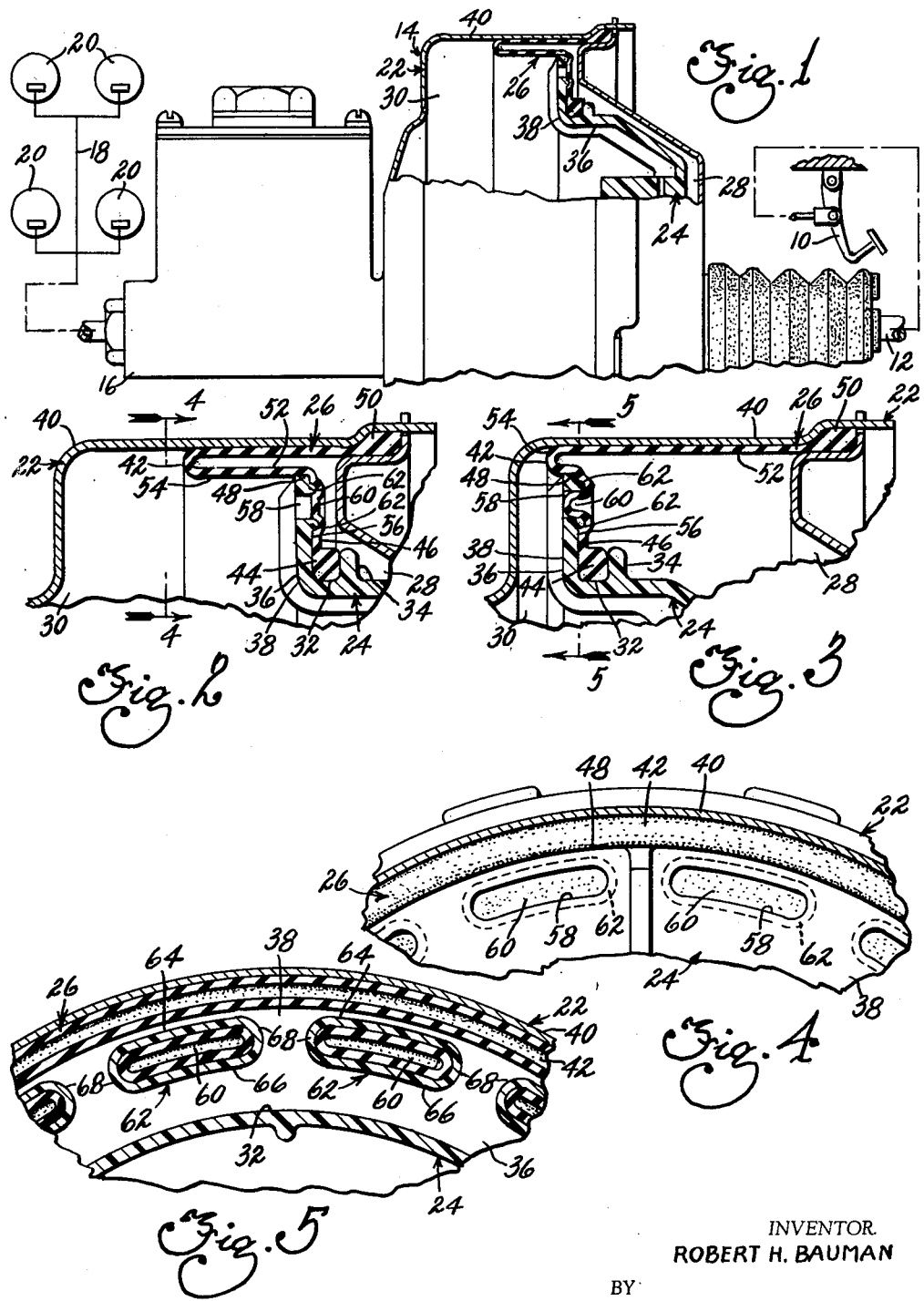

3,136,229
Patented June 9, 1964

3,136,229
POWER SERVO CONSTRUCTION
Robert H. Bauman, Dayton, Ohio, assignor to General Motors Corporation, Detroit, Mich., a corporation of Delaware
Filed June 20, 1962, Ser. No. 203,863
7 Claims. (Cl. 92—99)

The invention in its preferred form relates to a power servo of the fluid differential pressure actuated type, and more particularly to means for securing a rolling diaphragm in such a servo to the servo movable piston so as to prevent or substantially diminish the stretching effects on the diaphragm when differential pressures are applied thereto. Structure embodying the invention also aids in maintaining a positive seal between the diaphragm and the piston so as to maintain complete fluid separation between the differential pressure chambers.

In differential fluid pressure actuated servo mechanisms a rolling diaphragm may be utilized which is secured to the moving piston by stretching the inner peripheral flange into a groove provided on the outer periphery of the piston. The diaphragm then has a surface engaging a mating surface formed on a radially extending portion of the piston and extending toward the servo housing sidewall so that there is just sufficient space to provide for the rolling convolution of the diaphragm. The differential fluid pressure therefore acts on the piston and the portion of the diaphragm directly supported by surface engagement with the piston to obtain the full effect of the differential pressure. The pressure also acts on the unsupported portion of the diaphragm where only partial advantage of the differential pressure is obtained. In acting on the unsupported portion of the diaphragm, the differential pressure tends to stretch the diaphragm and to cause it to stretch and creep along the surface of the radially extending portion of the piston and to be pulled around the outer diameter of the piston. Structure embodying the invention is provided to eliminate or substantially reduce the creeping and stretching effects on the diaphragm along the mating surfaces of the diaphragm and piston. In the preferred embodiment, this structure includes several generally oblong apertures extending through the disk-like portion of the movable piston so as to interconnect the high and low pressure chambers. When the diaphragm is installed, it covers these apertures to prevent fluid communication between the chambers. Ridged construction is provided on the surface of the piston immediately adjacent the edges of the apertures so that the diaphragm is in surface engagement with these ridges. The ridges are preferably formed in the same shape as the apertures and may be extensions of the aperture edges. They are preferably rounded or otherwise smoothly formed so as to prevent damage to the diaphragm. When the differential pressures are applied to the servo, the high pressure is applied in the chamber on the side of the piston from which the ridges extend. This is the same pressure chamber containing the inner surface of the diaphragm convolution. The pressures in the two chambers are exposed to opposite sides of the diaphragm through the apertures so that the diaphragm is cupped into the apertures, tending to hold the diaphragm more tightly in surface engagement with the ridges adjacent the apertures to provide additional diaphragm securing means. In particular, this construction provides a resisting force which will resist the creep or stretching force exerted by the convolution portion of the diaphragm around the outside diameter of the piston. The resisting force will increase as the pressure differential increases, therefore building up to resist the proportional buildup of the stretching and creeping force exerted. This construction will substantially reduce or eliminate the radially outward force exerted on the diaphragm inner peripheral flange so that it does not tend to be moved outward from its groove at any point. A better diaphragm seal relationship to the piston is also obtained.

In the drawing:

FIGURE 1 is a side view of a servo embodying the invention as it may be installed in a vehicle brake system, portions of this system being schematically shown and having parts broken away and in section.

FIGURE 2 is an enlarged view of a portion of the servo of FIGURE 1, with parts broken away and in section, and showing the servo when there is substantially no differential pressure acting on the piston and diaphragm.

FIGURE 3 is similar to FIGURE 2 and shows the servo when there is a substantial differential pressure acting on the piston and diaphragm.

FIGURE 4 is a cross-sectional view of the servo taken in the direction of arrows 4—4 of FIGURE 2.

FIGURE 5 is a cross-section view of the servo taken in the direction of arrows 5—5 of FIGURE 3.

The vehicle braking system illustrated schematically in FIGURE 1 is merely indicative of the use to which a power servo embodying the invention may be directed. Such power servos may be utilized in any fluid pressure operated power system. The brake system illustrated includes the vehicle operator controlled brake pedal 10 mounted so as to be connected to the control rod 12 for the power servo 14. Details of the valve control system of the servo 14 are not illustrated since they are not pertinent to the invention. The power servo is connected to operate the master piston of a master cylinder 16 which is in turn fluid connected through conduit system 18 to the vehicle wheel brakes 20.

The servo 14 includes a housing 22 in which a reciprocably movable piston 24 is received. Piston 24 is suitably connected to the master piston of master cylinder 16 to move that piston in a manner well known in the art. A diaphragm 26 is secured to the piston 24 and the housing 22 and cooperates with the piston and the housing to divide the housing into differential pressure chambers 28 and 30. In the servo illustrated, chamber 28 is the high pressure chamber and chamber 30 is the low pressure chamber. This nomenclature is applicable whether the servo pressures are atmospheric pressure and vacuum, atmospheric and superatmospheric pressures, or other differential pressures. In some installations the servo may be operated by fluids other than air. In all instances, however, differential pressure chambers on opposite sides of the piston and diaphragm are provided and the pressures therein are controlled to provide controlled movement of the piston to operate a suitable mechanism connected to the servo output.

Referring to FIGURE 2 for details of construction, the piston 24 is provided with a channel or groove 32 on the outer surface thereof formed by a relatively low channel sidewall 34 and another channel sidewall 36 which may be extended to provide the piston annular radially extending section 38. Section 38 extends radially outward toward the housing sidewall 40 and is sufficiently spaced from that sidewall to permit the rolling convolution 42 of the diaphragm 26 to be operably received therebetween. In some constructions section 38 may have an axial component of extension as well as a radial component. Diaphragm 26 has an inner peripheral flange 44 formed thereon which is stretched over the piston, and particularly over the channel sidewall 34, and is elastically retained in the channel or groove 32. The diaphragm has a radially outward extending section 46 which is in surface engagement with the piston section 38. The diaphragm wraps around the outer diameter 48 of the piston and is then unsupported as it forms the convolution 42.

The diaphragm is provided with an outer peripheral flange 50 which is suitably secured to housing 22 so as to seal the housing at this point.

It has been found that the higher pressure acting on the surface 52 of the diaphragm 26 while the surface 54 of the diaphragm is exposed to the lower pressure in chamber 30 may cause the diaphragm to be pulled around the piston outer diameter 48, stretching the diaphragm and tending to pull flange 44 out of the channel 32. The diaphragm surface 54 which engages the piston surface 56 therefore tends to creep along this surface. In order to prevent the stretching and creeping movement of the diaphragm relative to the piston, apertures 58 are formed through the piston section 38 so as to interconnect chambers 28 and 30 subject to the positioning of the diaphragm section 46 which covers the apertures adjacent the piston surface 56. Thus the diaphragm has sections 60 extending over the apertures 58 which are unsupported by the piston so that the diaphragm surfaces 52 and 54 at sections 60 are respectively exposed to the differential pressures in chambers 28 and 30. In other types of installations where diaphragms are to be sealed and held by means embodying the invention, only one aperture may be required. In the power servo construction utilizing the annular piston section 38, however, several apertures are desirable, these apertures preferably being circumferentially spaced about the piston. If desired, the apertures 58 extending through the piston may be relatively small with the portions thereof adjacent the piston surface 56 being somewhat larger to permit the cupping effect of the diaphragm to be described while supplying greater support to the cupped portion of the diaphragm.

The piston section 38 also has ridges 62 formed immediately adjacent apertures 58 and extending out of the plane of piston surface 56 toward the high pressure chamber 28. Ridges 62 in their preferred form include an outer ridge section 64 and an inner ridge section 66 joined by end ridge sections 68 so as to provide an enclosed ridge construction around each aperture 58. In some instances the ridges may be open at the ends, or only one ridge may be required. It is preferable, however, to provide ridges on the radially inner and radially outer sides of the apertures 58 so as to obtain full benefit of the invention.

As is illustrated in FIGURES 3 and 5, the higher pressure in chamber 28 acts against the diaphragm sections 60 and urges those sections into apertures 58 so that a cupped configuration is obtained. At the same time the higher pressure is acting on the diaphragm convolution 42. This exerts a force on the diaphragm tending to pull it around the piston outer diameter 48. The cupping forces acting on diaphragm sections 60 create opposing forces tending to pull the diaphragm more tightly into engagement with the ridges 62. Since the diaphragm section is then not free to move to any substantial extent, the creeping and stretching action of the diaphragm section 46 is greatly reduced or eliminated so that it has little or no force effect tending to pull the diaphragm flange 44 out of the channel 32. A more positive diaphragm seal arrangement is also provided since the diaphragm tends to more tightly engage the ridges. This is particularly true when one or both of the ridges may extend circumferentially on the entire piston section 38.

A diaphragm and piston construction has been provided which prevents stretching of the diaphragm and movement of the diaphragm relative to the piston at their areas of surface engagement so as to prevent the diaphragm from being dismounted from the piston to any extent. The construction also provides a sealing arrangement by preventing such movement of the diaphragm as well as by increasing the engaging forces of the diaphragm relative to the piston. The increase in security of the diaphragm to the piston resulting from the structure embodying the invention is substantially proportional to the differential pressures acting on the diaphragm and piston arrangement.

I claim:

1. In a rolling diaphragm servomotor having a piston and a diaphragm and a housing divided into differential pressure chambers by said diaphragm and piston, diaphragm holding means for holding said diaphragm on said piston and comprising, an annular channel formed on said piston, an annular disc-like piston section extending radially outward from one wall of said channel and having a plurality of circumferentially spaced apertures extending therethrough axially of said piston to interconnect said differential pressure chambers, raised portions formed on said piston adjacent said apertures on the higher pressure chamber side of said piston, an annular bead formed on said diaphragm and received in said channel to retain said diaphragm on said piston, and a diaphragm section extending along and engaging the higher pressure chamber side of said piston disc-like section, said diaphragm section being tightly fitted to said raised portions by differential pressure acting thereon through said apertures to retain said diaphragm more tightly on said piston.

2. A fluid pressure actuated servomotor comprising a housing, a piston reciprocably mounted in said housing, a diaphragm having an outer periphery secured to said housing and an inner periphery elastically mounted on said piston, said piston and said diaphragm cooperating with said housing to define a first pressure chamber and a second pressure chamber subject to higher pressures than said first pressure chamber to move said piston in said housing, and means for additionally securing said diaphragm to said piston in proportion to the pressure differential acting thereon and comprising a plurality of ridges formed on said piston and apertures through said piston intermediate said ridges, said diaphragm engaging and covering said ridges and said apertures respectively whereby the higher pressure in said second pressure chamber urges said diaphragm into said apertures and causes said diaphragm to tightly engage said ridges in proportion to the pressure differential and hold said diaphragm in position on said ridges.

3. In a mechanism having a housing, a wall operatively secured to said housing and subject to differential pressures on opposite sides thereof and comprising one member having a first surface and a flexible diaphragm member having a second surface in surface engagement with and extending beyond said first surface, means for resisting relative movement of said flexible member on said first surface when differential pressures are applied to said wall, said means comprising an aperture through said one member at said first surface and ridge means formed on said one member extending out of the plane of said first surface adjacent said aperture, said flexible diaphragm member being held in surface engagement with said ridge means and deformably extended into said aperture by the differential pressures acting on said wall, whereby said diaphram member is secured to said wall one member so that relative movement therebetween along said commonly engaging surfaces is resisted.

4. A power servo operable by differing fluid pressures and having a housing, a power wall operatively secured to said housing, said power wall comprising a piston and a rolling diaphragm secured to said piston, said piston having aperture means therethrough and ridge means adjacent said aperture means, said diaphragm being in surface engagement with said piston to cover said aperture means and said ridge means and acted upon by the differing fluid pressures through said aperture means to be held in position on said piston against relative movement along the surface thereof, said piston having an annular radially extending section containing said aperture means and said ridge means, said aperture means comprising a plurality of circumferentially spaced surface depressions having fluid pressure connection through said piston.

5. A power servo operable by differing fluid pressures and having a housing and a power wall operatively secured to said housing, said power wall comprising a piston and a rolling diaphragm secured thereto, said piston having aperture means therethrough and ridge means adjacent said aperture means, said diaphragm being in surface engagement with said piston to cover said aperture means and said ridge means and acted upon by the differing fluid pressures through said aperture means to be held in position on said piston, said piston having an annular radially extending section containing said aperture means and said ridge means, said aperture means comprising a plurality of circumferentially spaced surface depressions having fluid pressure connection through said piston, said plurality of apertures being arcuate and said ridge means being arcuate ridges spaced radially in pairs on said piston annular radially extending section with one of said apertures between each such pair.

6. A power servo operable by differing fluid pressures and having a housing and a power wall operatively secured to said housing, said power wall comprising a piston and a rolling diaphragm secured thereto, said piston having aperture means therethrough and ridge means adjacent said aperture means, said diaphragm being in surface engagement with said piston to cover said aperture means and said ridge means and acted upon by the differing fluid pressures through said aperture means to be held in position on said piston, said piston having an annular radially extending section containing said aperture means and said ridge means, said aperture means comprising a plurality of circumferentially spaced surface depressions having fluid pressure connection through said piston, said plurality of apertures being arcuate and said ridge means being arcuate ridges spaced radially in pairs on said piston annular radially extending section with one of said apertures between each such pair, each of said pairs of arcuate ridges having ridge sections joining the ends thereof to form therewith a ridge enclosure about each of said plurality of apertures.

7. In a rolling diaphragm servomotor having a housing and a movable piston in said housing and a rolling diaphragm secured to said housing and said piston to define a high pressure chamber and a low pressure chamber in said housing, differential pressure operable means preventing diaphragm creep relative to said piston and comprising, a plurality of ridges formed on said piston on the side thereof engaged by said diaphragm and a plurality of apertures extending through said piston immediately adjacent said ridges and said diaphragm having a section thereof with one side exposed to said high pressure chamber and the other side engaging said piston and overlying said ridges and said apertures and exposed to said low pressure chamber through said apertures whereby the differential pressure in said chambers acts on said diaphragm to extend said diaphragm into said apertures and to hold said diaphragm in tight engagement with said ridges to prevent diaphragm movement on the surface of said piston.

References Cited in the file of this patent

UNITED STATES PATENTS

| 2,720,564 | Soreng et al. | Nov. 11, 1955 |
| 2,934,042 | Stelzer | Apr. 26, 1960 |
| 2,969,046 | Kellogg et al. | Jan. 24, 1961 |
| 2,988,353 | Dietrich | June 13, 1961 |
| 2,990,917 | Stelzer | July 4, 1961 |
| 2,993,478 | Cripe | July 25, 1961 |

FOREIGN PATENTS

| 76,255 | Austria | Apr. 25, 1919 |